US006068159A

United States Patent [19]

Rodriguez Reyes et al.

[11] Patent Number: 6,068,159

[45] Date of Patent: May 30, 2000

[54] DISPENSING MACHINE FOR BOOKLETS OR BROCHURES

[75] Inventors: Manuel Rodriguez Reyes; Narcis Sors Sors; Antonio Rodriguez Reyes, all of Barcelona, Spain

[73] Assignee: Fundacion Amigos Del Museo Del Prado, Madrid, Spain

[21] Appl. No.: 09/085,294

[22] Filed: May 27, 1998

[30] Foreign Application Priority Data

May 28, 1997 [ES] Spain .................................... 9701147

[51] Int. Cl.[7] .............................. B65H 1/08; B65G 59/00

[52] U.S. Cl. .......................... 221/232; 221/104; 221/124; 221/270; 221/279

[58] Field of Search .................................... 221/232, 279, 221/104, 124, 270

[56] References Cited

U.S. PATENT DOCUMENTS

| | | | |
|---|---|---|---|
| 2,522,033 | 9/1950 | Graham | 312/56 |
| 4,043,484 | 8/1977 | Vanjo | 221/213 |
| 4,496,074 | 1/1985 | Owens | 221/232 X |
| 4,508,238 | 4/1985 | Johnson et al. | 221/232 X |
| 4,530,444 | 7/1985 | Christian | 221/232 X |
| 5,165,571 | 11/1992 | Schlumpf | 221/232 X |
| 5,516,003 | 5/1996 | Hebert | 221/232 X |

FOREIGN PATENT DOCUMENTS

| | | |
|---|---|---|
| 0282457 | 9/1988 | European Pat. Off. . |
| 587247 | 4/1925 | France . |
| 2298837 | 8/1976 | France . |
| 2553309 | 6/1976 | Germany . |
| 682020 | 6/1993 | Switzerland . |
| 763971 | 12/1956 | United Kingdom . |
| 2207910 | 2/1989 | United Kingdom . |

OTHER PUBLICATIONS

English Translation of CH 682020 dated Jun. 30, 1993.
English translation of FR 587247 dated Apr. 14, 1925.
Publication—English Abstract of French Patent No. 2 298 837, Apr. 1972.

*Primary Examiner*—Christopher P. Ellis
*Assistant Examiner*—Gene O. Crawford
*Attorney, Agent, or Firm*—Ladas & Parry

[57] ABSTRACT

A machine for dispensing publications one by one having (a) housing defining an enclosed interior; (b) having an exit opening for dispensing the publications; (c) a platform for receiving a stack of the publications, the platform being supported within the housing for vertical movement between a plurality of positions; (d) a slider which, in an operating mode of the machine, is horizontally movable between fore and aft positions; the slider being disposed within the housing for contacting a topmost publication of the stack with the platform in one of the plurality of positions and for feeding the contacted publication to the exit opening when the slider is moved horizontally; (e) a coin operated mechanism for placing the machine into the operating mode, and (f) a mechanism disposed within the housing for automatically imparting a motion to the slider that pushes the slider against a rear edge of the topmost publication so as to move the topmost publication from the stack to the exit opening when the machine is placed into the operating mode. The mechanism for automatically imparting the motion to the slider includes a motor, a crank and a connecting rod operatively connected to each other and to the slider such that, in the operating mode, the motor rotates the crank which in turn drives the connecting rod to cause horizontal movement of the slider.

8 Claims, 7 Drawing Sheets

Fig. 3A
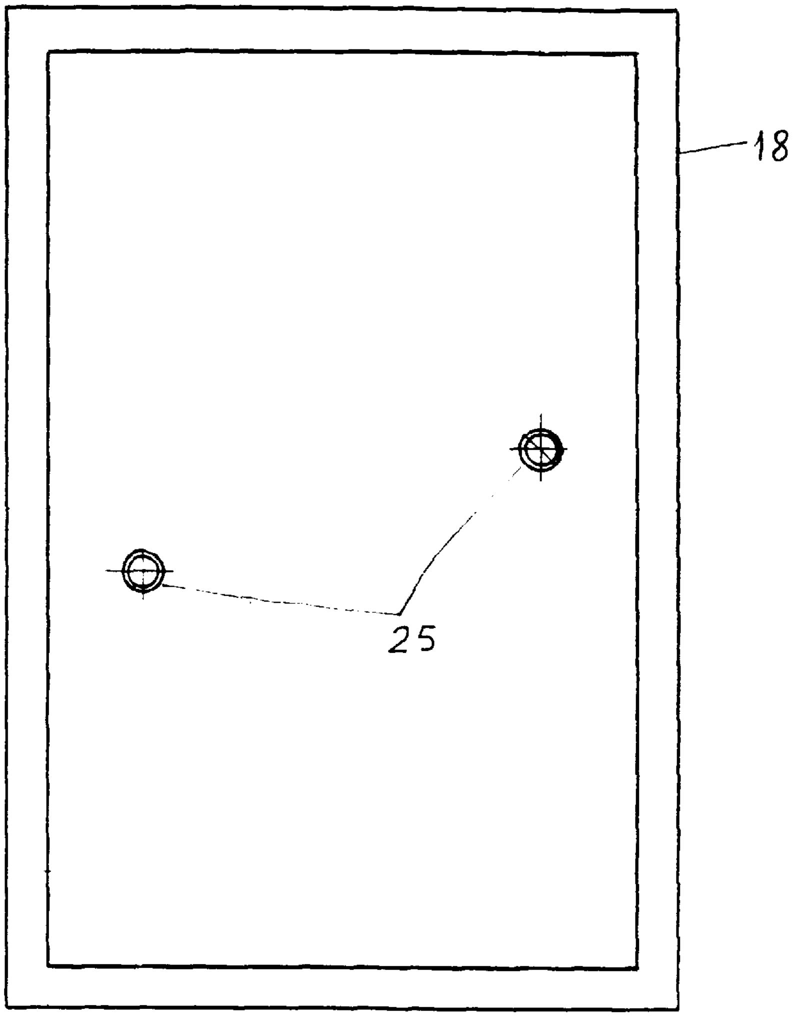
Fig. 3B
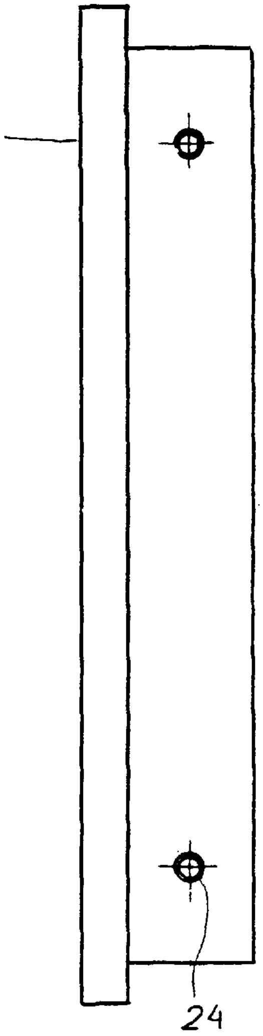
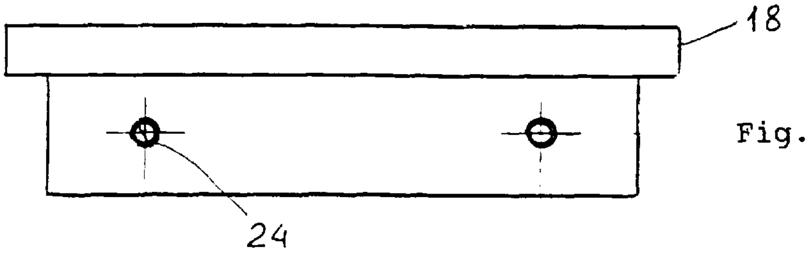
Fig. 3C

Fig. 4A
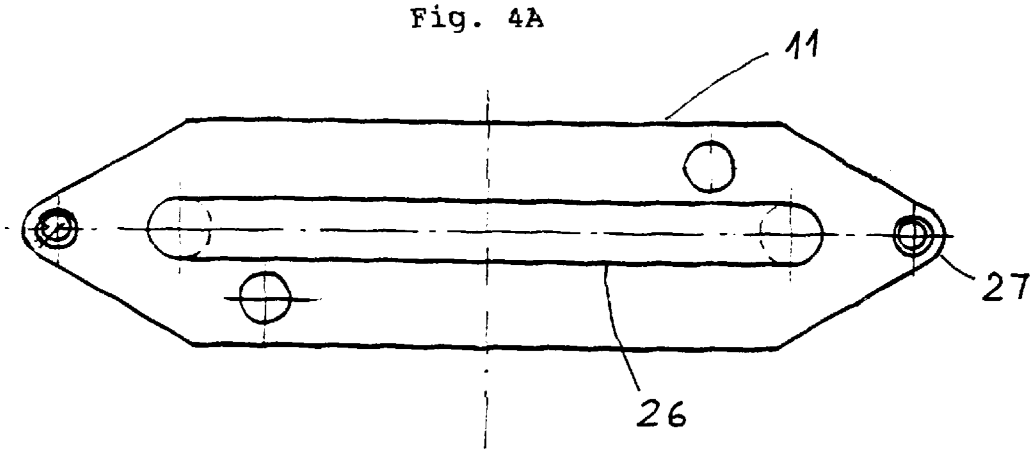
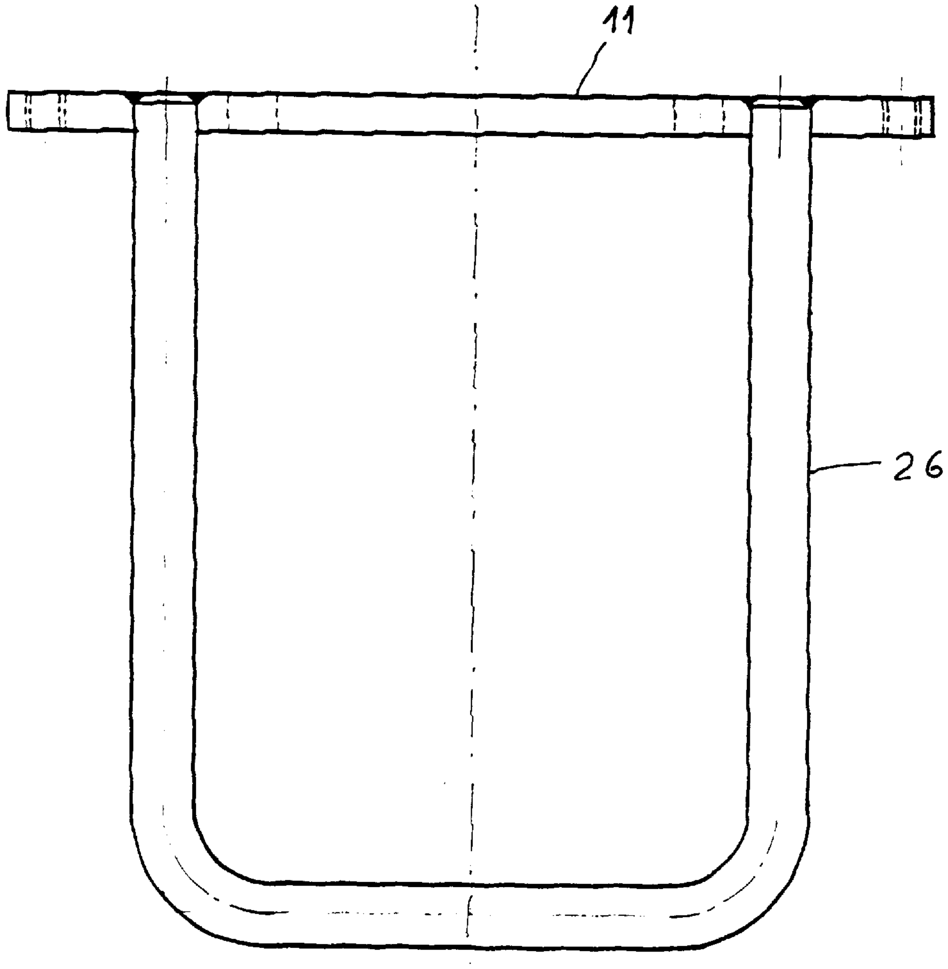
Fig. 4B

Fig. 5A
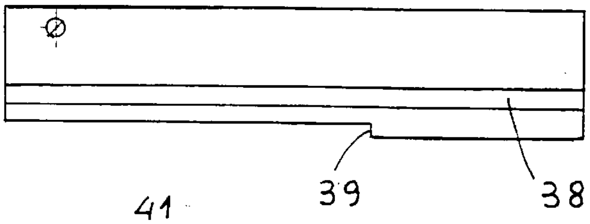
Fig. 5B
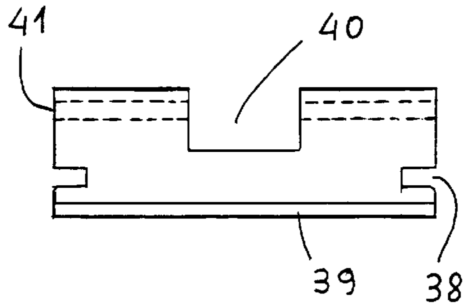
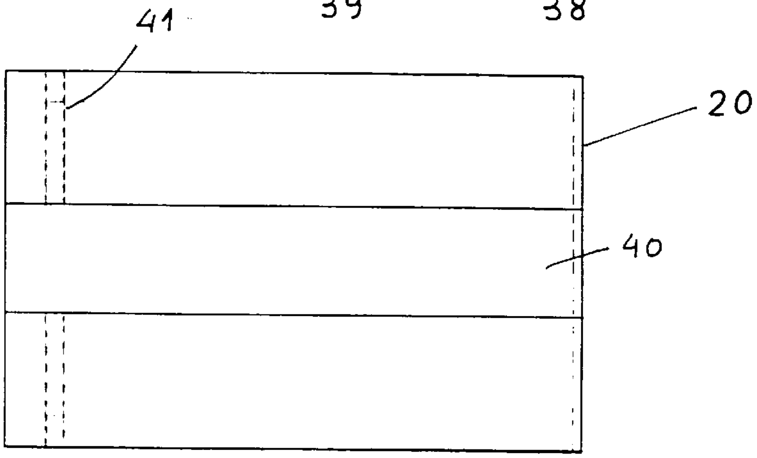
Fig. 5C

DISPENSING MACHINE FOR BOOKLETS OR BROCHURES

FIELD OF THE INVENTION

The present invention refers to a dispensing machine for booklets or brochures, of the type that can be operated by introducing coins, and which is intended to be used especially in museums and similar establishments where informative booklets or brochures about selected authors and their works are dispensed.

TECHNICAL BACKGROUND

In the state of the art many machines of this type are known, intended for the dispensing of newspapers, magazines or other informative booklets, and in all of which the intention is to resolve drawbacks associated with their specific application. For this reason one may not speak, in reality, of advantages and drawbacks when comparing one with another as, in each case, their specific features are determined by the use for which they are intended.

Thus, for example, the French patent 7536083 refers to a newspaper dispensing machine which, being intended to resolve the problem of electrical supply, as it is a machine that is to be situated in a public thoroughfare, was developed in such a way that its operation was completely manual, by means of a handle that drags hooking components which rest upon the stack of newspapers and drag them by their rear edge by means of manually operating the said handle, once this is released by introduction of the corresponding coins.

In the German document 2553309 a newspaper dispensing machine is described that features a complicated device of levers and springs and in which articulated levers are used as dragging components, which have claws at one end that fall upon the newspaper to drag it toward the exit opening.

In the British patent 2.207.910 a machine is described that includes an extraordinarily complex device of levers, springs, cogwheels with chains and other sophisticated devices, in which the newspaper dragging component is made up of needles applied to the upper side of the newspapers, the said machine being specially designed to be secure against tampering.

SUMMARY OF THE INVENTION

Contrary to the machines briefly described hereinbefore, that proposed by the present application is specially designed for the distribution of booklets in museums, galleries and similar places, and it is intended to have, along with a relatively simple construction and automatic operation, a relatively small height, so that when situated in galleries it does not interfere with the viewing of the works exhibited.

Moreover, the said machine may be completely autonomous, as it is also designed to be operated by electric batteries incorporated in it, so that it may be taken from one place to another, mounted on a base of turning wheels, without having to provide an electrical power supply linked to the mains in each place.

In the machine proposed by the present invention, the dragging system for the booklets and brochures, whereby they are delivered to the purchaser, is carried out by means of the lower step of a slider situated in the upper part of the machine, which is applied to the rear edge of the booklet situated in the top position on a stack of booklets, and not by means of components that affect the upper side of the booklets and which might damage the appearance of the same, as happens with some of the machines known in the state of the art, since these are not intended for such ephemeral use as the newspapers distributed by some of the machines equipped with needles or claws for pushing each item.

In the present invention, the stack of booklets is arranged upon a platform that slides vertically in lateral guides and is impelled upward by counter-weights applied constantly by the upper part of the stack against the lower side of the extraction slider.

BRIEF DESCRIPTION OF THE DRAWINGS

Other advantages and features of the invention will be deduced from the following detailed description of an embodiment of the same, represented in the accompanying drawings, in a completely non-restrictive way, and in which:

FIGS. 3A, 3B and 3C are, respectively, top plan view, side elevation and end elevation views of the supporting and raising platform of the unit of stacked booklets;

FIGS. 4A and 4B are, respectively, a bottom plan view and an elevational view of a handle to be joined underneath to the platform in FIGS. 3A to 3C;

FIGS. 5A, 5B and 5C are, respectively, side elevation, end and top plan views of the slider that pushes the booklets;

DESCRIPTION OF THE PREFERRED EMBODIMENT

Figure 1:
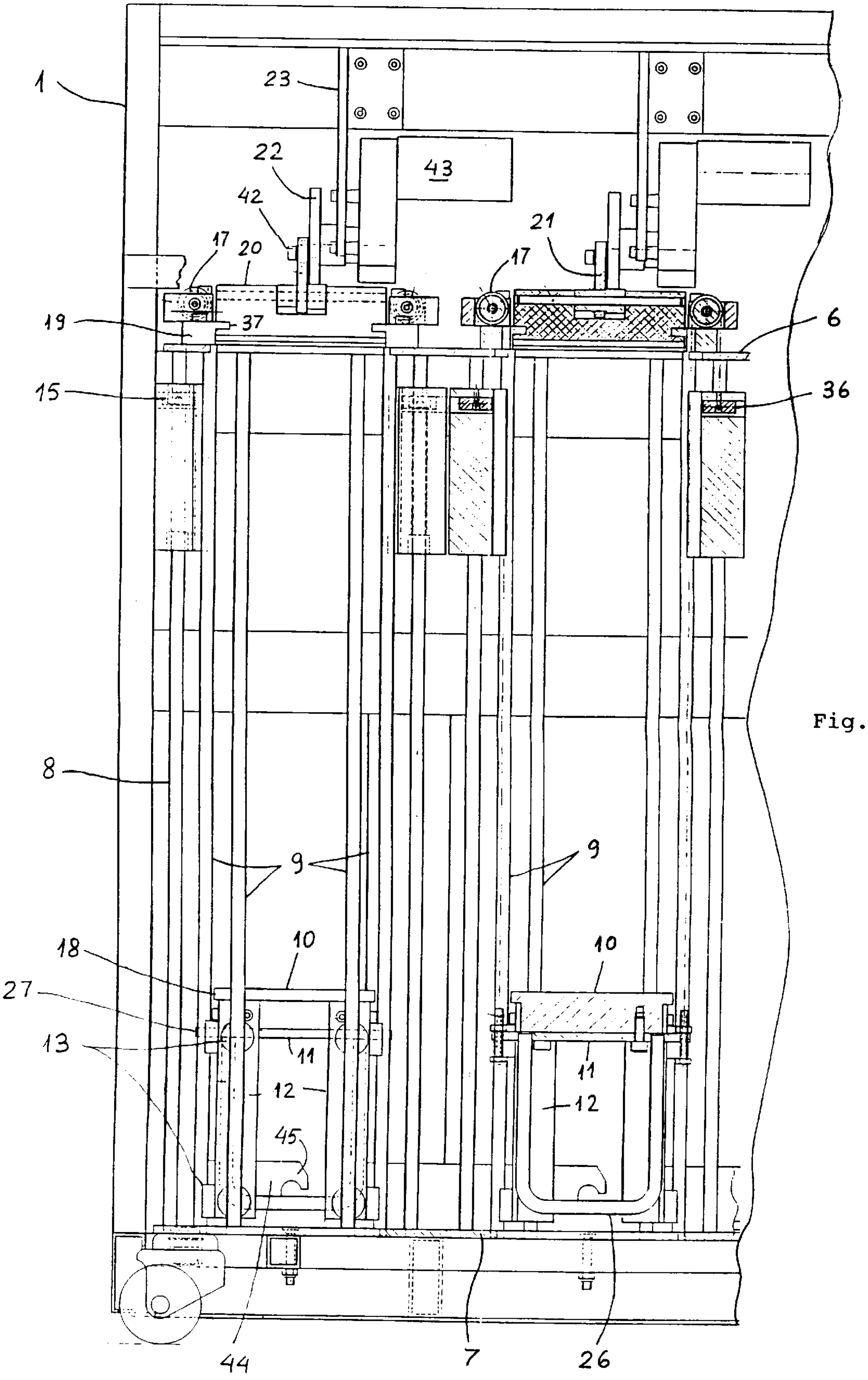
FIG. 1 is a front view of the left-hand part of the machine, with some parts of the same being sectioned.
Figure 2:
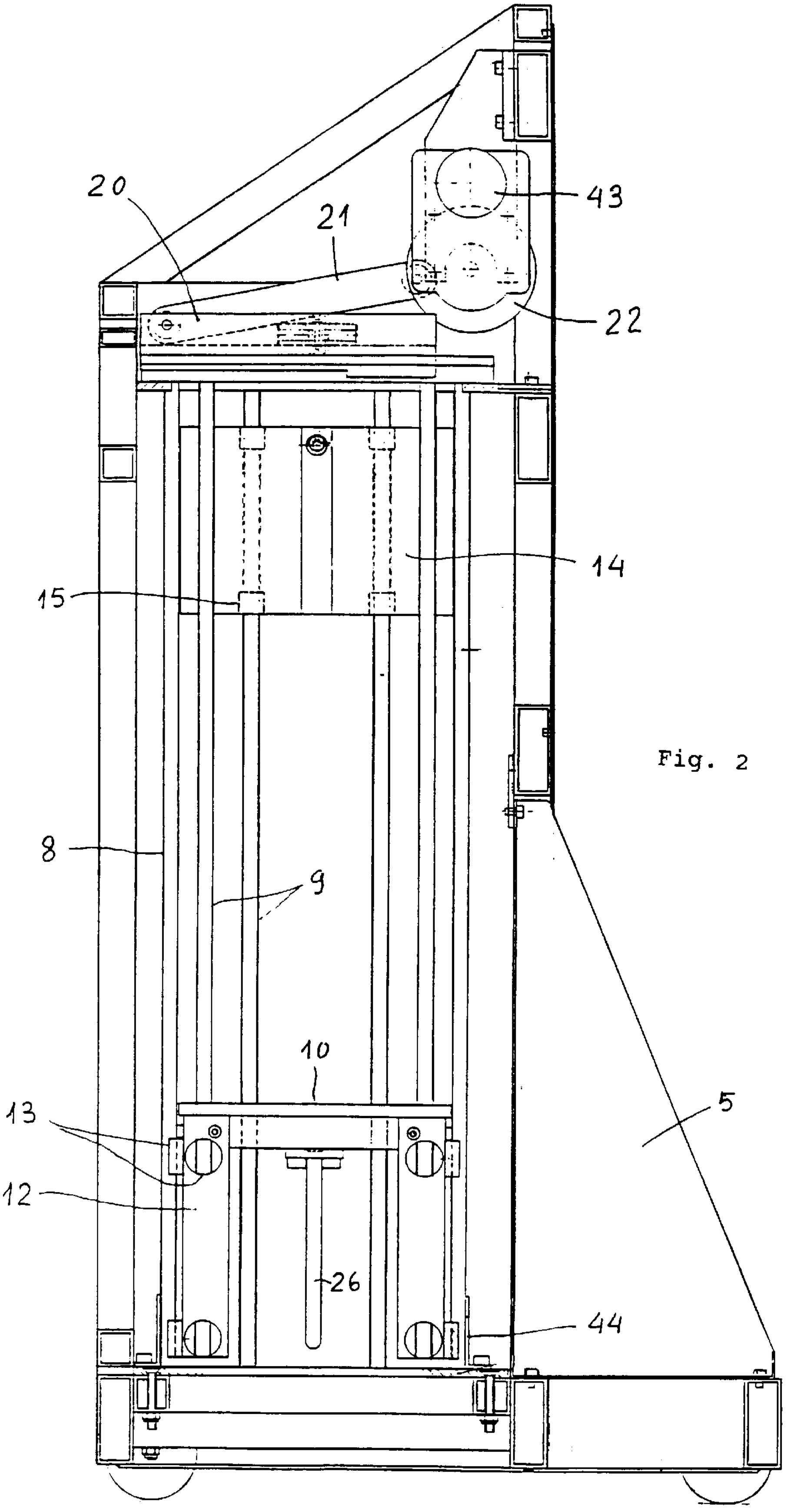
FIG. 2 is a view taken from the left end of the machine from FIG. 1, partly sectioned.
Figure 7:
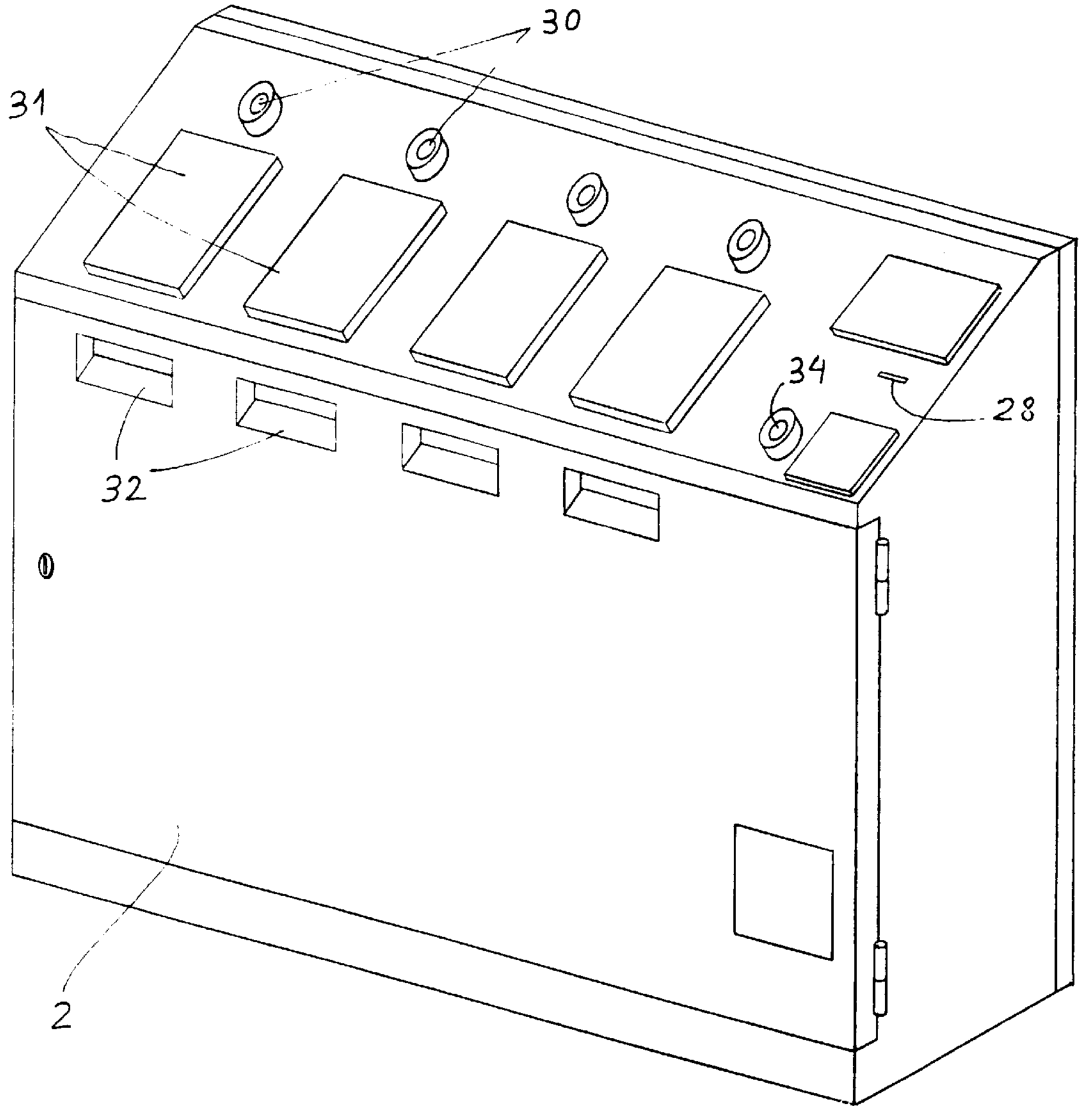
FIG. 7 is a front perspective view showing the general appearance of a preferred embodiment of the machine proposed by the present invention.

Firstly, we refer to FIGS. 1 and 2, in which the machine's entire internal mechanism is represented, pointing out that this is made up, in accordance with FIG. 7, of a set of identical modules (four in the said figure) for the sale of different types of booklets, according to the choice made by the purchaser, the said modules being aligned side to side to form an integrated unit. Operation of all the modules is the same, so this description will only refer to the two on the left-hand side shown in FIG. 1, which are sectioned by two different longitudinal vertical planes.

The machine consists essentially of a structure or supporting frame (1), upon whose lower part or base a horizontal panel (7) rests and which has, near the upper part, a horizontal panel (6), between which several vertical rails (9) are fixed that serve as guides for the vertical movement of a platform (10) for supporting and raising the booklets.

The said raising platform (10), as represented in greater detail in FIGS. 3A to 3C, is made up of a rectangular-shaped block that has on its upper part a projecting peripheral flange (18), under which, at each corner, respective angle irons (12) are fixed by means of screws in threaded holes (24). These angle irons (12) serve to support respective pairs of guide shoes (13), which have arched hollows to receive the guide rails (9) along which they slide vertically.

The said raising platform (10) has two threaded holes (25) in its lower side to attach a panel (11) (see FIGS. 4A and 4B) to which a handle (26) is joined that is made up of a bar bent in the shape of a "U". The said handle serves to make the platform descend to the lower part to be refilled with booklets when none remain upon the said platform.

The handle's panel (11) has ends with sides that converge toward a rounded tip (27) which projects from each side of the raising platform (10), each end of which has a small hole to attach a wire, cable or fishing line that ascends vertically and passes through an upper pulley (17), from where it descends vertically to join to the upper part of a counter-weight (14) (FIGS. 6A and 6B) at a fastening point on the same.

Figures 6A, 6B:
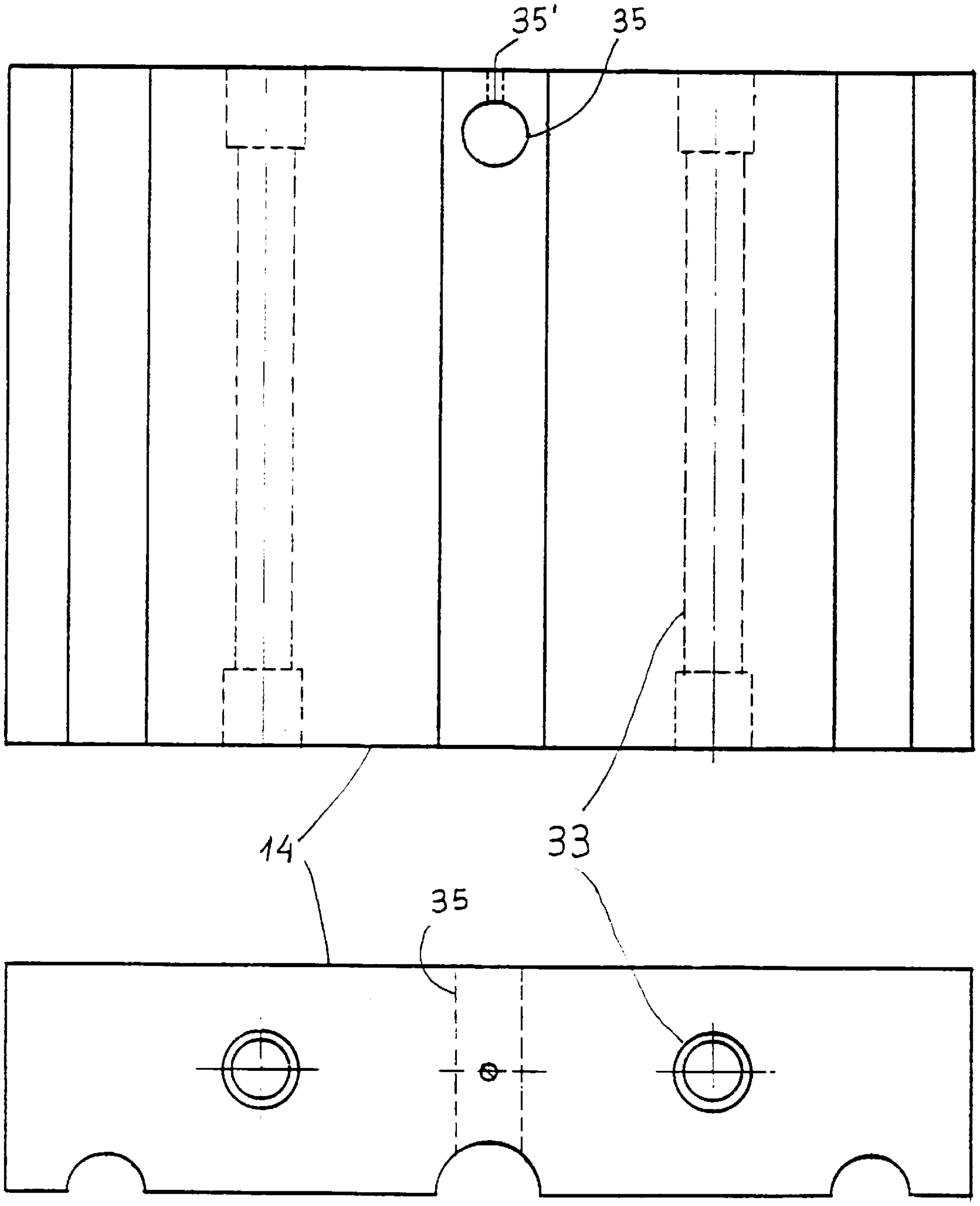
FIGS. 6A and 6B are, respectively, elevation and top plan views of one of the counter-weights for raising the supporting platform of the booklets.

As shown in FIGS. 6A and 6B, the counter-weight (14) is made up of a block in which there are two vertical holes (33) with their ends widened to receive in a tight-fitting way the respective sliding collars (15), made of suitable material, by means of which they slide along a pair of vertical guide rails (8), which are also joined to the upper and lower horizontal panels (6 and 7), respectively. The vertical inner side of the counter-weight (14) has vertical grooves with a semicircular cross section corresponding to the section of the guide rails (9) of the raising platform (10), along which they also slide by means of the said grooves; the said counter-weight block (14) also has, near its upper part, a transverse drill hole (35) that has in its upper part a small vertical orifice (35') for passing the supporting wire which attaches to a cylindrical component (36) introduced into the said transverse drill hole (35).

As may be observed in FIG. 1, each dispensing device has two counter-weights (14), situated one at each side of the raising platform (10), so that this is made to rise in a balanced way by means of the corresponding traction wires that operate simultaneously in their respective pulleys (17).

The pulleys (17) through which the raising wires pass are situated upon guides (19) that have respective horizontal facing wings (37) which are introduced into the corresponding lateral channels (38) (FIGS. 5A to 5C) of a slider (20), which is suspended slightly above the upper panel (6) and which may slide backward and forward in the said guides (19).

The said slider (20) is shown in more detail in FIGS. 5A to 5C, in which it may be observed that the lower side of the slider has a transverse step (39) which is applied to the rear edge of a booklet (not shown) situated immediately below the slider to push it forward when the booklet is bought by a customer. The slider (20) also has a large longitudinal channel (40) that intercepts a transverse drill hole (41) near to the front side of the same and in which a cylindrical bar is introduced that serves as an axis to articulate the head of a connecting rod (21) to push the slider (20), for which purpose the rear end of the said connecting rod (21) is jointed to the pivot (42) of a crank (22) which, in turn, is actuated by a gearmotor (43) fixed by means of suitable anchoring points to an upper support (23) joined to a rear upper bar of the machine's structure (1).

As shown in FIGS. 1 and 2, the output shaft of the gearmotor is directly joined to the axis of the crank (22), the point of articulation of the latter with the connecting rod (21) being situated near the periphery of the former, so that when the crank (22) is turned, the connecting rod (21), and therefore the slider (20), are thrust forward in their trajectory, which is determined by the diameter of the turning circle of the pivot (42) joint of the connecting rod (21) with the crank (22). In its retracted position, the slider's lower step (39) applies to the rear edge of the booklet situated immediately beneath, that is, the first on the stack of booklets situated upon the raising platform (10), and drags it to the maximum point of advance of the slider, in such a way that it projects sufficiently through the corresponding front opening (32) of the machine to be taken out by the purchaser.

The machine is operated by the usual system of introducing coins, arranged in the described embodiment on the right end of the machine and common to all dispensing devices. The said device includes all the usual elements of this type of machines, such as the crack or slot (28) for introducing coins, the corresponding buttons (30) for starting the extraction of the booklet selected, the button (34) for recovering coins, etc., elements whose relative positions may be observed in the embodiment of the machine described, as represented in its general shape in FIG. 7; these elements being, in themselves, known and therefore not constituting the object of the invention, will not be described in further detail.

Under each selection button (30) there is a window (31) in which a copy is displayed of each booklet available for sale.

Although the dispensing machine of the present invention could be supplied in the usual way, by means of a cable connected to a mains power socket, it incorporates its own supply batteries, situated inside a container (5) at the rear of the machine, as shown in FIG. 2, which makes it completely autonomous and movable.

When the booklets or brochures in each dispensing device have run out, the machine is reloaded with another stack. To do this, once the front door (2) is open the raising platform (10) is lowered by means of the handle (26) to the lower part of the machine. To facilitate the said reloading there is, at each side of the raising platform, a longitudinal profile (44) which, correspondingly with the centre of the lower part of the handle (26), has several angled recesses that determine in the said profile corresponding projections (45) in the shape of downward-pointing hooks, between which and the lower part of the handle (26) a bar (not shown) may be introduced, by means of which the platform remains held in the lower position while reloading is carried out.

Although an illustrative embodiment of the invention has been described and represented, it is evident that modifications and extensions could be introduced therein that would be included within the scope of the same; the invention is not to be considered limited to the embodiment described in the specification, but only to the scope of the content of the following claims.

What is claimed is:

1. In a machine for dispensing publications one by one comprising: (a) a housing defining an enclosed interior and having an exit opening for dispensing said publications; (b) a platform for receiving a stack of said publications, said platform being supported within the housing for vertical movement between a plurality of positions; (c) a slider which, in an operating mode of the machine, is horizontally movable between fore and aft positions, said slider being disposed within the housing for contacting a topmost publication of said stack with the platform in one of said plurality of positions and for feeding said contacted publication to said exit opening when said slider is moved horizontally; and (d) a coin operated mechanism for placing the machine into the operating mode, the improvement comprising means disposed within the housing for automatically imparting a motion to the slider that pushes the slider against a rear edge of the topmost publication so as to move said topmost publication from said stack to said exit opening when said machine is placed into said operating mode, said means comprising a motor, a crank and a connecting rod operatively connected to each other and to the slider such that, in said operating mode, the motor rotates the crank which in turn drives the connecting rod to cause horizontal movement of the slider, the housing comprising a horizontal upper panel, a horizontal lower panel and a plurality of first vertical rails for guiding said platform, each of said vertical rails having first and second ends that are attached to the upper and lower panels respectively, said machine further comprising (i) counterweight means for raising said platform from one of said plurality of positions to another, said counterweight means comprising a plurality of counterweights each of which is disposed in the housing at a side of the platform; (ii) a plurality of pulleys disposed on the upper panel, and (iii) a plurality of cables each of which is disposed in one of the pulleys and each of which has a first end attached to a side of the platform and a second end attached to one of the counterweights, and (iv) a plurality of pairs of second vertical rails connected between the upper and lower panels for guiding said counterweights.

2. A dispensing machine as claimed in claim 1 wherein the slider comprises a step which is disposed such that the step contacts the rear edge of the topmost publication when the slider moves horizontally.

3. A dispensing machine as claimed in claim 1, wherein the pairs of second vertical rails comprise sliding guide collars and each of the counterweights comprises a block with a plurality of vertical perforations that are widened at ends thereof to receive the sliding guide collars of the pairs of second vertical rails.

4. A dispensing machine as claimed in claim 1 wherein said slider comprises means for contacting a rear edge of the topmost publication when the slider moves horizontally without affecting an upper side of the topmost publication.

5. A dispensing machine as claimed in claim 4 wherein the publications are books or brochures.

6. In a machine for dispensing publications one by one comprising: (a) a housing defining an enclosed interior and having an exit opening for dispensing said publications; (b) a platform for receiving a stack of said publications, said platform being supported within the housing for vertical movement between a plurality of positions; (c) a slider which, in an operating mode of the machine, is horizontally movable between fore and aft positions, said slider being disposed within the housing for contacting a topmost publication of said stack with the platform in one of said plurality of positions and for feeding said contacted publication to said exit opening when said slider is moved horizontally; and (d) a coin operated mechanism for placing the machine into the operating mode, the improvement comprising means disposed within the housing for automatically imparting a motion to the slider that pushes the slider against a rear edge of the topmost publication so as to move said topmost publication from said stack to said exit opening when said machine is placed into said operating mode, said means comprising a motor, a crank and a connecting rod operatively connected to each other and to the slider such that, in said operating mode, the motor rotates the crank which in turn drives the connecting rod to cause horizontal movement of the slider, wherein the platform comprises handle means on an underside thereof for lowering the platform manually to a bottommost of said plurality of positions when the platform is empty of publications whereby a new stack of publications can be placed on the platform with the platform at said bottommost position, said housing comprising means for holding said platform at said bottommost position, whereby a new stack of publications can be placed on the platform with the platform at said bottommost position, said housing comprising means for holding said platform at said bottommost position.

7. A dispensing machine as claimed in claim 6, wherein said means for holding the platform comprises a plurality of lateral profiles with openings and a transverse bar for inserting into said openings above the handle.

8. In a machine for dispensing publications one by one comprising: (a) a housing defining an enclosed interior and having an exit opening for dispensing said publications; (b) a platform for receiving a stack of said publications, said platform being supported within the housing for vertical movement between a plurality of positions; (c) a slider which, in an operating mode of the machine, is horizontally movable between fore and aft positions, said slider being disposed within the housing for contacting a topmost publication of said stack with the platform in one of said plurality of positions and for feeding said contacted publication to said exit opening when said slider is moved horizontally; and (d) a coin operated mechanism for placing the machine into the operating mode, the improvement comprising means disposed within the housing for automatically imparting a motion to the slider that pushes the slider against a rear edge of the topmost publication so as to move said topmost publication from said stack to said exit opening when said machine is placed into said operating mode, said means comprising a motor, a crank and a connecting rod operatively connected to each other and to the slider such that, in said operating mode, the motor rotates the crank which in turn drives the connecting rod to cause horizontal movement of the slider, wherein the slider comprises a longitudinal recess in a side edge thereof and a transverse drill hole in portions of the slider on each side of the recess, the transverse drill hole being parallel to said side edge, said connecting rod having a head with an articulation axis that is disposed in the drill hole and a rear end connected to a pivot of the crank, said pivot being in the shape of a disc and having a center that is joined to an output shaft of the motor.

* * * * *